US010250642B2

(12) United States Patent
Ferrara et al.

(10) Patent No.: US 10,250,642 B2
(45) Date of Patent: Apr. 2, 2019

(54) SYSTEM, METHOD AND APPARATUS FOR FINE-GRAINED PRIVACY SPECIFICATION AND VERIFICATION

(71) Applicant: International Business Machines Corporation, Armonk, NY (US)

(72) Inventors: Pietro Ferrara, White Plains, NY (US); Marco Pistoia, Amawalk, NY (US); Omer Tripp, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 15/223,848

(22) Filed: Jul. 29, 2016

(65) Prior Publication Data
US 2018/0034857 A1 Feb. 1, 2018

(51) Int. Cl.
*H04L 29/06* (2006.01)
*G06F 21/57* (2013.01)
*G06F 21/62* (2013.01)

(52) U.S. Cl.
CPC ............ *H04L 63/20* (2013.01); *G06F 21/577* (2013.01); *G06F 21/6245* (2013.01); *H04L 63/04* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 8,365,243 B1* | 1/2013 | Lu | G06F 21/10 380/287 |
| 8,499,152 B1* | 7/2013 | Chen | H04L 63/102 713/155 |
| 9,710,752 B2* | 7/2017 | Salajegheh | G06N 5/04 |
| 2010/0212010 A1* | 8/2010 | Stringer | G06F 21/52 726/22 |
| 2011/0145918 A1* | 6/2011 | Jung | G06F 21/52 726/22 |
| 2013/0152154 A1* | 6/2013 | Xiao | G06F 21/00 726/1 |

(Continued)

OTHER PUBLICATIONS

Tripp, Omer, et al, "A Bayesian Approach to Privacy Enforcement in Smartphones", Aug. 20-22, 2014, pp. 174-190, San Diego, CA.*

(Continued)

*Primary Examiner* — Trang T Doan
(74) *Attorney, Agent, or Firm* — Scully, Scott, Murphy & Presser, P.C.; Daniel Morris, Esq.

(57) ABSTRACT

A method includes receiving from a user via a user interface an activation of at least one element to set a privacy policy specifying the maximum amount of confidential data that is authorized to be leaked to a sink, tracking movement of confidential data through an application, determining based on the tracked movement of the confidential data that the confidential data is leaked to the sink by the application, comparing the confidential data that is leaked to the sink to the specified maximum amount of confidential data that is authorized to be leaked to the sink, and presenting to the user via the user interface an indication of whether the application complies with the privacy policy set by the user based on the comparison.

20 Claims, 4 Drawing Sheets

(56) References Cited

U.S. PATENT DOCUMENTS

| | | | |
|---|---|---|---|
| 2013/0227714 A1* | 8/2013 | Gula | G06F 21/64 |
| | | | 726/32 |
| 2014/0059690 A1* | 2/2014 | Li | G06F 21/577 |
| | | | 726/25 |
| 2016/0132679 A1* | 5/2016 | Li | G06F 21/6245 |
| | | | 726/23 |
| 2017/0093926 A1* | 3/2017 | Chan | H04L 63/205 |

OTHER PUBLICATIONS

Enck, William et al. "TaintDroid: An Information-Flow Tracking System for Realtime Privacy Monitoring on Smartphones" OSDI '10 Proceedings of the 9th USENIX conference on Operating systems design and implementation,Oct. 10, 2010, pp. 393-407, Berkley, CA.

Arzt, Steven, "Flow Droid: Precise Context, Flow, Field, Object-sensitive and Lifecycle-aware Taint Analysis for Andorid Apps", Proceedings of the 35th ACM SIGPLAN Conference on Programming Language Design and Implementation, 2014, pp. 259-269, NewYork, NY.

* cited by examiner

SYSTEM, METHOD AND APPARATUS FOR FINE-GRAINED PRIVACY SPECIFICATION AND VERIFICATION

FIELD

The present application relates generally to providing fine-grained privacy specification and verification for user devices.

BACKGROUND

Mobile devices are rich in sensors. For example, mobile devices often include a Global Positioning System (GPS) tracker, microphone, and camera. Mobile devices also often have access to numerous sources of personal information including the device ID, contacts, and social data of a user. This richness of information increases the functionality of mobile applications running on the mobile device but also creates privacy threats. The balance between privacy and functionality is subtle, as the user clearly wishes to maximize both. For example, an e-commerce application with offerings and promotions based on the user's location would often like to transmit the user's city or zip code from the user's mobile device to its server. The privacy loss of such a transmission is marginal (city and zip code are considered coarse location information) and in return useful contextual functionality is enabled for the e-commerce application, e.g., promotions and offerings to local stores. On the other hand, sharing fine-grained location information with the e-commerce application's server, such as, for example, the user's exact GPS coordinates, may be unjustified.

BRIEF SUMMARY

The methods, systems, and computer program products described herein provide ways to provide fine-grained privacy specification and verification for user devices.

In an aspect of the present disclosure, a method is disclosed including presenting a user interface via a display of a computing device. The user interface includes at least one element that is activatable by a user to set a privacy policy. The privacy policy specifies a maximum amount of confidential data that is authorized to be leaked to a sink. The method further includes receiving from the user via the user interface an activation of the at least one element to set the privacy policy. The activation specifies the maximum amount of confidential data that is authorized to be leaked to the sink. The method further includes tracking movement of confidential data through an application, determining based on the tracked movement of the confidential data that the confidential data is leaked to the sink by the application, comparing the confidential data that is leaked to the sink to the specified maximum amount of confidential data that is authorized to be leaked to the sink, and presenting to the user via the user interface an indication of whether the application complies with the privacy policy set by the user based on the comparison.

In an aspect of the present disclosure, a method is disclosed including at least one processor comprising hardware and a display coupled to the at least one processor. The at least one processor may be configured to present a user interface via the display. The user interface includes at least one element that is activatable by a user to set a privacy policy. The privacy policy may specify a maximum amount of confidential data that is authorized to be leaked to a sink. The at least one processor may be further configured to receive from the user via the user interface an activation of the at least one element to set the privacy policy. The activation may specify the maximum amount of confidential data that is authorized to be leaked to the sink. The at least one processor may be further configured to track movement of confidential data through an application, determine based on the tracked movement of the confidential data that the confidential data is leaked to the sink by the application, compare the confidential data that is leaked to the sink to the specified maximum amount of confidential data that is authorized to be leaked to the sink, and present to the user via the user interface an indication of whether the application complies with the privacy policy set by the user based on the comparison.

In aspects of the present disclosure apparatus, systems, and computer program products in accordance with the above aspect may also be provided.

Further features as well as the structure and operation of various embodiments are described in detail below with reference to the accompanying drawings. In the drawings, like reference numbers indicate identical or functionally similar elements.

DETAILED DESCRIPTION

The methods, systems, and computer program products described herein provide ways to provide fine-grained privacy specification and verification for user devices.

Privacy testing, verification and enforcement are all problems that have received considerable attention from the research community. For instance, some privacy applications perform static taint-based privacy verification of Android® applications, while others feature low-overhead real-time privacy enforcement by detecting attempts to release sensitive data. Yet others prevent applications from leaking confidential data by restricting the data an application can access. A key limitation of existing approaches is that they base privacy verification and enforcement at a coarse level without accounting for potential declassification rules. For example, the location of the user device may be treated as a single unit of information without reference to the many sub-fields that are included in "location". For example, "location" may include both coarse location, e.g., city, state, country, zip code, etc., and fine grain location, e.g., GPS coordinates, triangulated location, mac-address, wireless access points information, home address, work address, etc. As a result, legitimate application behaviors, for example, releasing the user's city rather than the user's full address or GPS location, are perceived as privacy violations.

Figure 1:
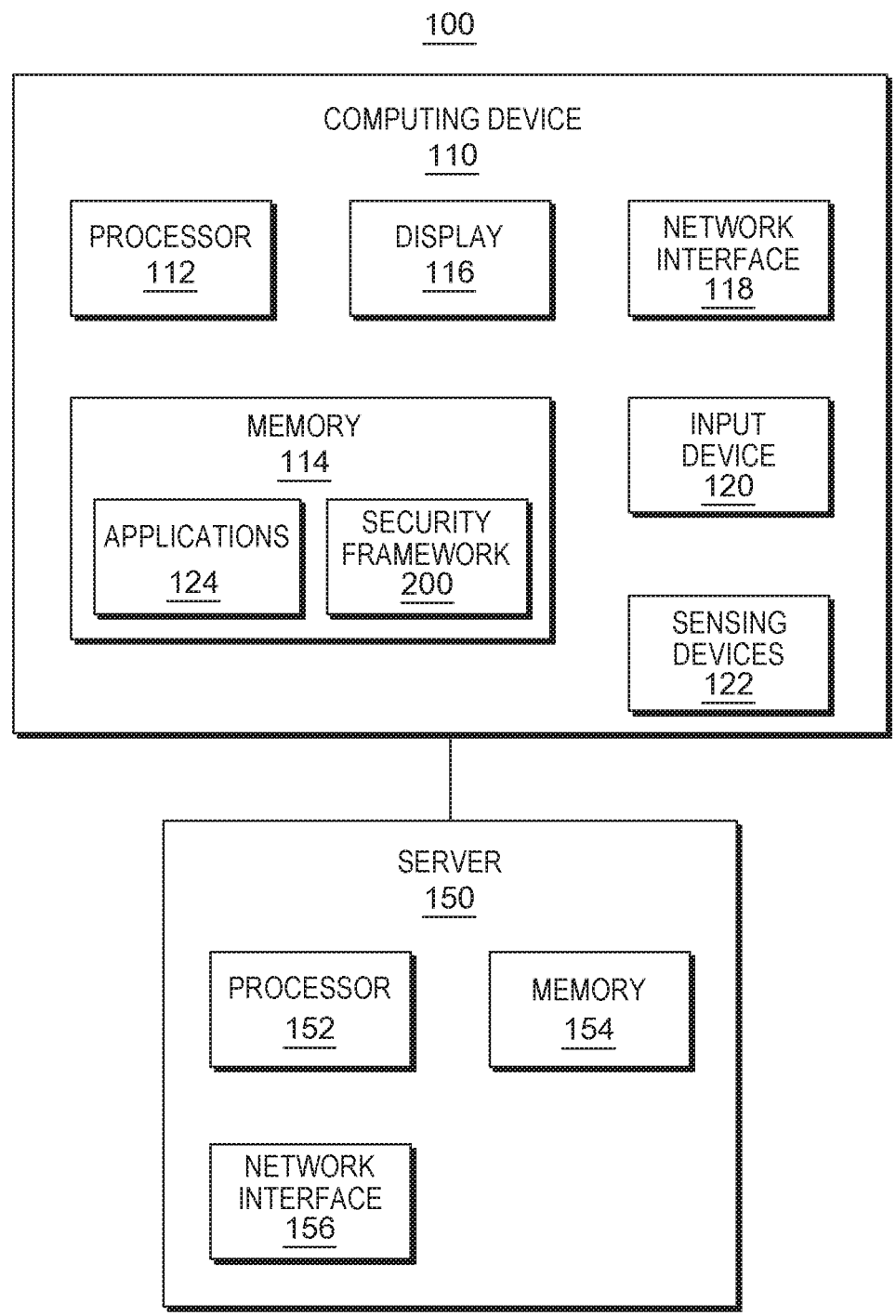
FIG. 1 is a system diagram of a system for fine-grained privacy specification and verification in accordance with an aspect of the present disclosure.

Referring now to FIG. 1, a system 100 providing fine-grained privacy specification and verification for user devices is disclosed. System 100 may include, for example, a computing device 110 and one or more servers 150. Computing device 110 may include, for example, at least one processor 112, memory 114, a display 116, a network interface 118, input device 120, one or more sensing devices 122, and any other feature commonly found in a computing device. Computing device 110 may include, for example, personal computers, tablets, laptops, mobile devices, smart phones, smart watches, smart wearable devices, or other similar computing devices. Servers 150 may include at least one processor 152, memory 154, a network interface 156, and any other feature commonly found in a server. Servers 150 may, for example, be associated with third-party applications 124 that may be implemented or executed by computing device 110.

Memory 114 may include instructions, software, and/or programs that may be executed by processor 112. In some aspects, memory 114 may include applications 124 that may be implemented by computing device 110. For example, third-party applications may be downloaded, installed, or otherwise executed by computing device 110.

Display 116 is configured to visually convey information to a user of computing device 110. Display 116 may include, for example, computer displays, television displays, smart device displays, smart phone displays, smart watch displays, projectors, a virtual reality headset display, or any other display or screen capable of visually presenting information to a user. In some aspects, display 116 may also function as an input device 120. For example, display 116 may be a touch screen.

Network interface 118 may be configured to communicate with server 150, another computing device, the internet, the cloud, or any other device, via wired or wireless technology. For example, network interface 118 may communicate with a network interface 156 of server 150.

Input device 120 may include a mouse, keyboard, gamepad, touch screen, button, or any other input device that provides a user with the capability to interact with computing device 110.

Sensing devices 122 may include any sensing device such as, for example, a microphone, digital camera, video camera, GPS tracker, gyroscopes, motion sensors, and other similar sensing devices. Sensing device 122 may be configured to generate sensor data. The sensor data may be provided to computing device 110 and may be stored in memory 114. In some aspects, the sensor data may be transmitted via network interfaces 118 and 156 to server 150 for storage in memory 154. In some aspects, the sensor data may be stored on the internet, in the cloud, on a remote server, and/or in any other location.

Although the processor 112, memory 114, display 116, network interface 118, input device 120, and sensing device 122 are described in the context of a single computing device 110, one or more of these components may also or alternatively be provided in one or more separate or additional computing devices 110.

In some aspects, when an application 124 is implemented or executed by computing device 110, the possibility of a confidential data leakage may arise. For example, various applications 124 often require permission to access confidential data stored on computing device 110 or confidential information about a user of computing device 110. For example, applications 124 may often have access to pictures, video, a photo gallery, a user's contact list, a user's phone number, a user's call log, memory 114, sensing devices 122, passwords, and other similar confidential data.

One way of determining whether there is a potential leakage of confidential or sensitive data by an application is to perform or run an analysis on the application. In some aspects, the analysis may be a static analysis. The analysis may track the movement of sensitive information, e.g., location, phone number, contacts, etc., through the application. The sensitive information originates at a source, e.g., a memory access, an API method returning sensitive information (e.g., location information, password, etc.), or other similar sources. The analysis tracks movement of the sensitive information through the application until the sensitive information reaches a sink, e.g., an API method writing the sensitive information to a socket, transmitting the sensitive information outside of the computing device, storing the sensitive information in memory, logging and writing to a file, etc.

Figure 2:
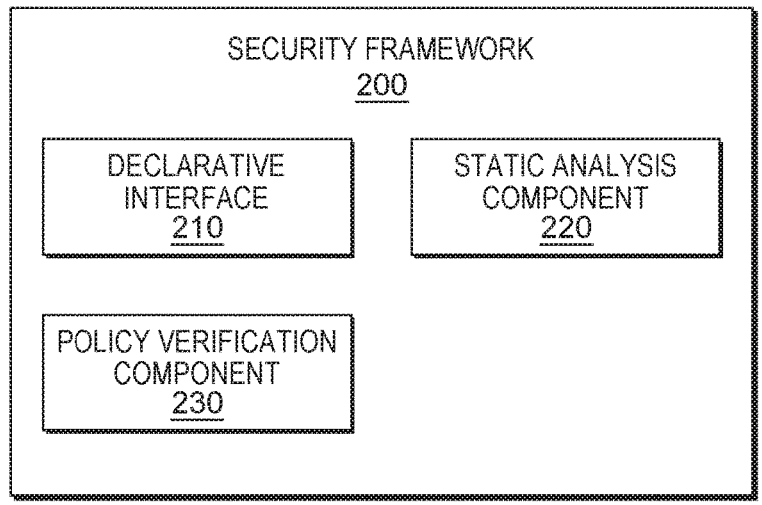
FIG. 2 is a diagram of a security framework in accordance with an aspect of the present disclosure.

Referring now to FIG. 2, system 100 may provide a security framework 200 for structured data-leakage detection and verification. Security framework 200 may track the flow of fine-grained privacy units, including tracking conversions between private objects in an efficient and scalable manner. In some aspects, security framework 200 may include a declarative interface 210, a static analysis component 220, and a policy verification component 230.

Figure 3:
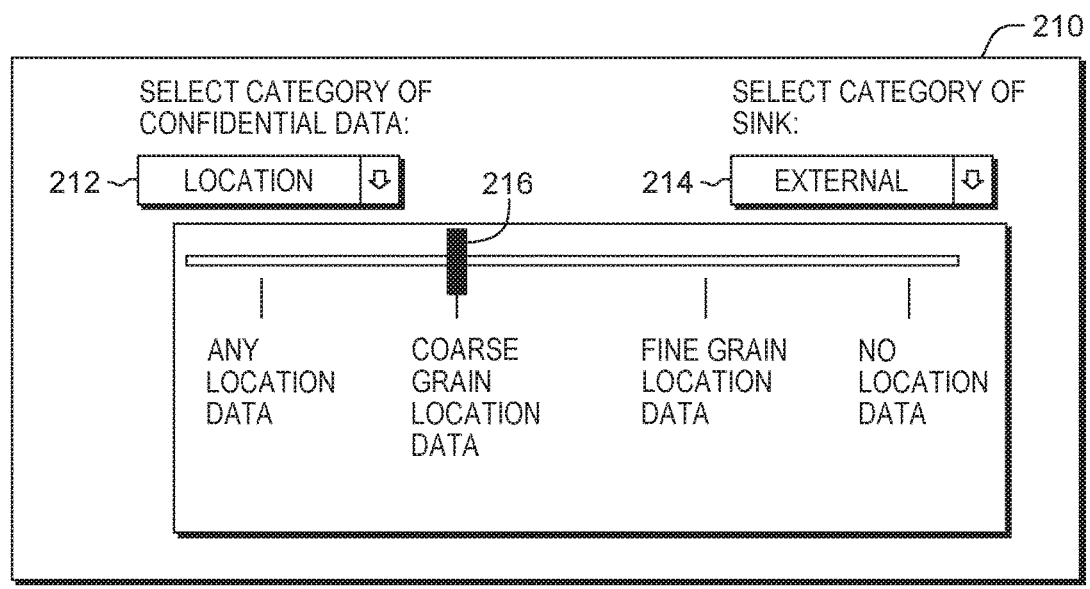
FIG. 3 is an example user interface in accordance with an aspect of the present disclosure.

Declarative interface 210 is configured to provide a user with a way to express fine-grained privacy policies. Declarative interface 210 may be a user interface presented to a user via display 116. An example declarative interface 210 is illustrated in FIG. 3. The policies may specify privacy constraints as combinations of fine-grained units of private data whose release to external observers is authorized. As an example, a user of computing device 110 may specify via declarative interface 210 that an application is allowed to release the device ID together with either the longitude or the latitude (but not both). Declarative interface 210 may define a specification language and provide a user interface that allows the user to precisely define fine-grain privacy policies that set a maximum amount of confidential information that may be leaked. Declarative interface 210 may also allow the user to define in the fine-grain privacy policies the parties to which the confidential information may be leaked. In some aspects, different types of sinks may be aggregated into different categories. For example, sinks "logging and writing to a file" and "storing information in memory" may be aggregated into a category "internal" while a sink "transmitting to a server" may be aggregated into a category "external". Similarly, different types of confidential data may be grouped together. For example, an International Mobile Station Equipment Identity (IMEI) and phone number of computing device 110 may be grouped into a category "identifiers", GPS coordinates, longitude, latitude, home address, and other fine-grain location information may be grouped into a category "fine-grain location", and city, zip code, state, country, and other similar coarse-grain location information may be grouped into a category "coarse-grain location". In some aspects, both the fine-grain location and coarse-grain location categories may also be combined to form a generic "location" category.

Declarative interface 210 may present categories 212 of confidential data and categories 214 of sinks to the user and may allow the user to specify the maximum amount of confidential data that may be leaked to a particular sink. For example, the user may indicate that the confidential data in the "identifiers" category may be leaked to sinks in the "internal" category. In another example, the user may specify that the maximum amount of data in the "location" category 212 that may be leaked to sinks in the "external" category 214 may be those found in the "coarse-grain location" category by activating or actuating an element 216. For example, the confidential data categories may also be ranked in a hierarchy based on a level of confidentiality, e.g., the category "fine-grain location" may be ranked higher than the category "coarse-grain location" such that when the user sets the maximum amount of confidential data to the category "coarse-grain location", the category "fine-grain location" may not be included as authorized by the user. In another example, if the user sets the maximum amount of confidential data to the category "fine-grain location", the category "coarse-grain location" may also be authorized by virtue of having a lower ranking than the category "fine-grain location".

Static analysis component 220 is configured to track the flow of the fine-grained privacy units. For example, static analysis component 220 may precisely and conservatively model semantic transformations (for example, the conversion of a location into its corresponding address), determine the confidential data that may be leaked, and determine the sink to which the confidential data may be leaked. For example, static analysis component 220 may apply a rich semantic static analysis, where each item of confidential data consists of multiple privacy units, such that the relationships and correlations between the units are modeled explicitly. As an example, a confidential data category "location" may include privacy units such as, for example, longitude, latitude, altitude, city, state, address, etc. For example, the longitude and latitude together may form the user's position. Static analysis component 220 may further account for semantic transformations of the privacy units. For example, if the longitude or latitude is cast into an integer, static analysis component 220 may infer that the fractional unit has been discarded. Based on the static analysis, static analysis component 220 determines what privacy units of confidential data have been leaked to what specific sinks. For example, static analysis component 220 may output pairings of privacy units of confidential data, e.g., longitude, latitude, etc., and the corresponding sinks, e.g., "log", "write to file," etc. to which the privacy units of confidential data have been leaked for use by policy verification component 230. In some aspects, the pairing may include more than one privacy unit of confidential data for each corresponding sink.

Policy verification component 230 is configured to compare the output of static analysis component 220 to the fine-grained privacy policy set by the user via declarative interface 210. For example, policy verification component 230 may compare the privacy units of confidential data that are leaked to the corresponding sinks identified by static analysis component 220 to the fine-grained privacy policies for each of the categories of confidential data and sinks set by the user via declarative interface 210. For example, for each leaked confidential data and type of sink, policy verification component 230 may check if the leaked data is below a maximum level specified by the user in the privacy policy.

Figure 4:
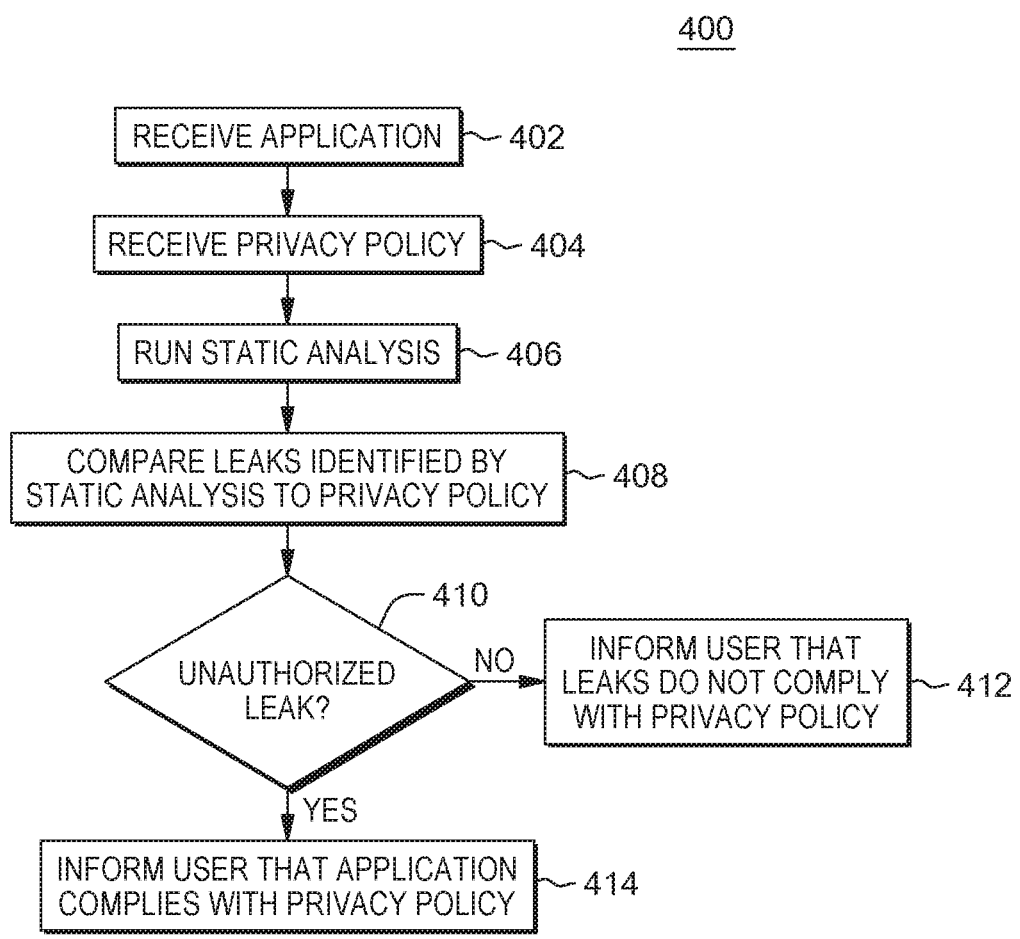
FIG. 4 is a flow chart illustrating an example method of fine-grained privacy specification and verification in accordance with an aspect of the present disclosure.

With reference now to FIG. 4, a method 400 is disclosed. At 402, computing device 110 may receive, install, or implement an application. For example, the application may be a third party application downloaded or installed by a user of computing device 110. At 404, declarative interface 210 may be presented to the user, for example, via display 116, and the user may define or specify fine-grained privacy policies via declarative interface 210. For example, the user may specify via declarative interface 210 a maximum amount of confidential data that may be leaked to a particular sink. For example, the user may specify that the category "coarse-grain location", e.g., city, zip code, one but not both of longitude and latitude, etc. may be the maximum amount of confidential data that may be leaked to sinks in the category "external" e.g., a server 150 related to the application. As another example, the user may specify via declarative interface 210 that confidential data in the category "fine-grain location" such as GPS coordinates, address, longitude and latitude together, etc. may be leaked to sinks in the category "internal" such as, for example, writes to local memory. In some aspects, any leakage that is not specified by one of the fine-grained privacy policies may be considered an unauthorized leakage by policy verification component 230. At 406, static analysis component 220 is run on the application to determine whether any atomic privacy units of confidential data are leaked and if so, to which sinks. For example, static analysis component 220 may determine that the user's GPS coordinates are leaked to a server 150 associated with the application, e.g., confidential data of the category "fine-grain location" is leaked to a sink in the category "external". At 408, Policy verification component 230 compares the leaked confidential data and the corresponding sink to the fine-grained privacy policies set by the user via declarative interface 210 and determines whether the fine-grained privacy policies have been violated. For example, if the fine-grained privacy policy specifies that confidential data in the category "fine-grained location" could be leaked to sinks of the category "internal" but not to sinks of the category "external" and static analysis component 220 determines that the GPS coordinates from the category "fine-grained location" has been leaked to a server 150 associated with the application, i.e., a sink of the category "external", the comparison of the leak to the fine-grained privacy policy results in the identification of an unauthorized leak. At 410, policy verification component 230 determines whether an unauthorized leak is detected based on the comparison. If an unauthorized leak is detected, the user is informed via declarative interface 210 that the application does not meet the requirements of the user's fine-grained privacy policies at 412. In some aspects, policy verification component 230 may also provide to the user via declarative interface 210 what confidential data is leaked by the application and the sink to which the confidential data is leaked. If an unauthorized leak is not detected, for example, the application does not leak any confidential data in a manner that does not comply with the user's fine-grained privacy policies, policy verification component 230 may inform the user via declarative interface 210 that the application complies with the user's fine-grained privacy policies at 414. In some aspects, policy verification component 230 may also or alternatively actively enforce the user's fine-grain privacy policies, for example, by preventing an application from performing unauthorized leakage of confidential data when the unauthorized leakage fails to comply with the user's fine-grain privacy policies.

Figure 5:
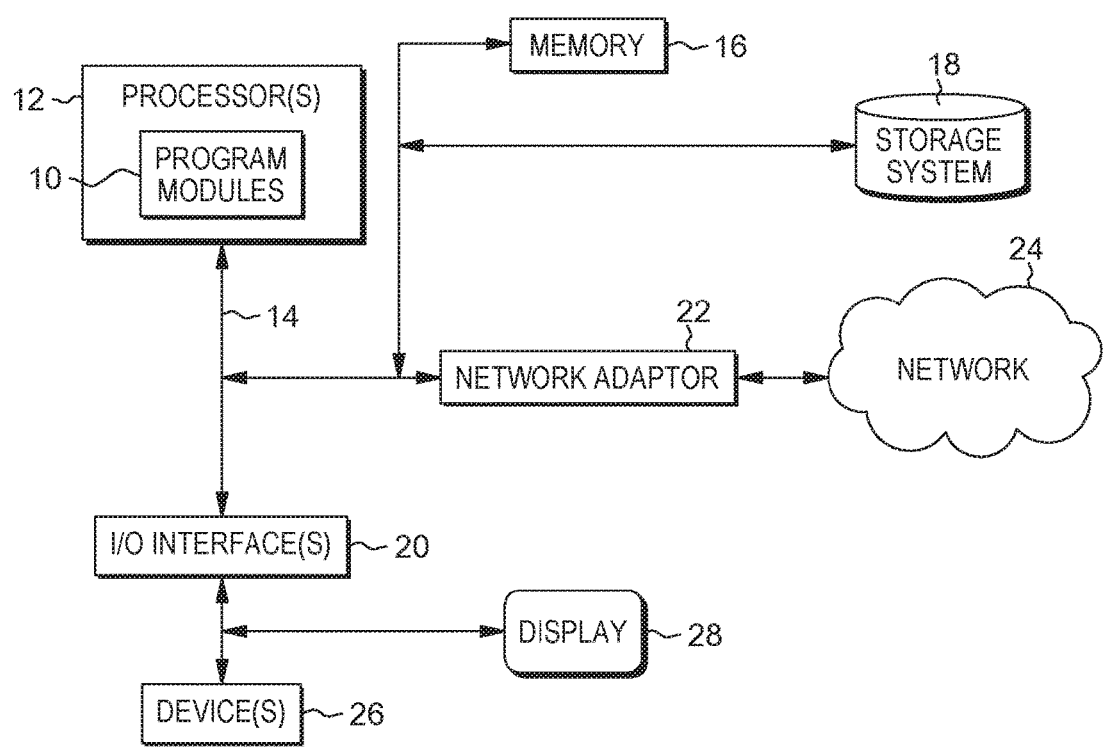
FIG. 5 illustrates a schematic of an example computer or processing system that may implement any component of the system for fine-grained privacy specification and verification in accordance with an aspect of the present disclosure.

FIG. 5 illustrates a schematic of an example computer or processing system that may implement any or all of system 100, computing device 110, server 150, and in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the system shown in FIG. 1 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, one or more processors or processing units 12, a system memory 16, and a bus 14 that couples various system components including system memory 16 to processor 12. The processor 12 may include one or more program modules 10 that perform the methods described herein. The program modules 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A method performed by at least one hardware processor, comprising:
presenting a user interface via a display of a computing device, the user interface including at least one element that is activatable by a user to set a privacy policy, the privacy policy specifying a maximum amount of confidential data that is authorized to be leaked to a sink;
receiving from the user via the user interface an activation of the at least one element to set the privacy policy, the activation of at least one element comprising a selecting a category of fine-grain confidential data and specifying the maximum amount of fine-grain confidential data that is authorized to be leaked to the sink;
tracking movement of confidential data through an application, said tracking comprising tracking said fine-grain confidential data originating at a source and being transferred into a sink;
determining based on the tracked movement of the confidential data that the confidential data is leaked to the sink by the application;
comparing the confidential data that is leaked to the sink to the specified maximum amount of confidential data that is authorized to be leaked to the sink; and
presenting to the user via the user interface an indication that the application complies with the privacy policy set by the user upon determining that fine-grain confidential data that is leaked to the sink is below the specified maximum amount of confidential data that is authorized to be leaked to the sink, or
presenting to the user via the user interface an indication that the application does not comply with the privacy policy set by the user upon determining that the fine-grain confidential data that is leaked to the sink is above the specified maximum amount of fine-grain confidential data that is authorized to be leaked to the sink.

2. The method of claim 1, wherein the activating of at least one element comprises a selecting a category of coarse-grain confidential data, the category of fine-grain confidential data or coarse-grain confidential data comprises at least one of fine-grain location, coarse-grain location, and identifiers.

3. The method of claim 1, wherein the activation of the at least one element by the user includes a selection by the user of a category of sinks including the sink, wherein the maximum amount of confidential data is authorized to be leaked to the category of sinks.

4. The method of claim 3, wherein the category of sinks comprises at least one of internal sinks and external sinks.

5. The method of claim 1, wherein the tracking of the fine-grain confidential data originating at a source and being transferred to a sink comprises: tracking a logging or writing of data to a file, or tracking a writing confidential data to a socket using an API method, tracking a storing of data to a memory, or tracking a transmission of information outside of the computing device.

6. The method of claim 5, wherein a category of the fine-grain confidential data or coarse-grain confidential data is ranked according to a hierarchy based on a level of confidentiality, said maximum amount of confidential data set for a higher ranking category that may be leaked including confidential data of a lower ranking confidential data category.

7. The method of claim 1, further comprising: preventing an application from performing an unauthorized leakage of said fine-grain confidential data when the unauthorized leakage fails to comply with the user's privacy policy setting.

8. A system comprising:
at least one processor comprising hardware; and
a display coupled to the at least one processor, the at least one processor configured to:
present a user interface via the display, the user interface including at least one element that is activatable by a user to set a privacy policy, the privacy policy specifying a maximum amount of confidential data that is authorized to be leaked to a sink;
receive from the user via the user interface an activation of the at least one element to set the privacy policy, the activation of at least one element comprising a selecting a category of fine-grain confidential data and specifying the maximum amount of fine-grain confidential data that is authorized to be leaked to the sink;
track movement of confidential data through an application by tracking fine-grain confidential data originating at a source and being transferred into a sink;
determine based on the tracked movement of the confidential data that the confidential data is leaked to the sink by the application;
compare the confidential data that is leaked to the sink to the specified maximum amount of confidential data that is authorized to be leaked to the sink; and
present to the user via the user interface an indication that the application complies with the privacy policy set by the user upon determining that fine-grain confidential data that is leaked to the sink is below the specified maximum amount of confidential data that is authorized to be leaked to the sink, or
present to the user via the user interface an indication that the application does not comply with the privacy policy set by the user upon determining that the fine-grain confidential data that is leaked to the sink is above the specified maximum amount of fine-grain confidential data that is authorized to be leaked to the sink.

9. The system of claim 8, wherein the activating of at least one element comprises a selecting a category of coarse-grain confidential data, the category of fine-grain confidential data or coarse-grain confidential data comprises at least one of fine-grain location, coarse-grain location, and identifiers.

10. The system of claim 8, wherein the activation of the at least one element by the user includes a selection by the user of a category of sinks including the sink, wherein the maximum amount of confidential data is authorized to be leaked to the category of sinks.

11. The system of claim 10, wherein the category of sinks comprises at least one of internal sinks and external sinks.

12. The system of claim 8, wherein to track the fine-grain confidential data originating at a source and being transferred to a sink, the at least one processor is further configured to: track a logging or writing of data to a file, or track a writing confidential of data to a socket using an API method, track a storing of data to a memory, or track a transmission of information outside of the computing device.

13. The system of claim 9, wherein a category of the fine-grain confidential data or coarse-grain confidential data is ranked according to a hierarchy based on a level of confidentiality, said maximum amount of confidential data set for a higher ranking category that may be leaked including confidential data of a lower ranking confidential data category.

14. The system of claim 8, wherein the at least one processor is further configured to: prevent an application from performing an unauthorized leakage of said fine-grain confidential data when the unauthorized leakage fails to comply with the user's privacy policy setting.

15. A non-transitory computer readable medium storing instructions that, when executed by at least one processor, configure the at least one processor to:
present a user interface via a display of a computing device, the user interface including at least one element that is activatable by a user to set a privacy policy, the privacy policy specifying a maximum amount of confidential data that is authorized to be leaked to a sink;
receive from the user via the user interface an activation of the at least one element to set the privacy policy, the activation of at least one element comprising a selecting a category of fine-grain confidential data and specifying the maximum amount of confidential data that is authorized to be leaked to the sink;
track movement of confidential data through an application by tracking said fine-grain confidential data originating at a source and being transferred into a sink;
determine based on the tracked movement of the confidential data that the confidential data is leaked to the sink by the application;
compare the confidential data that is leaked to the sink to the specified maximum amount of confidential data that is authorized to be leaked to the sink; and
present to the user via the user interface an indication that the application complies with the privacy policy set by the user upon determining that fine-grain confidential data that is leaked to the sink is below the specified maximum amount of confidential data that is authorized to be leaked to the sink, or
present to the user via the user interface an indication that the application does not comply with the privacy policy set by the user upon determining that the fine-grain confidential data that is leaked to the sink is above the specified maximum amount of fine-grain confidential data that is authorized to be leaked to the sink.

16. The non-transitory computer readable medium of claim 15, wherein the activating of at least one element comprises a selecting a category of coarse-grain confidential data, the category of fine-grain confidential data or coarse-grain confidential data comprises at least one of fine-grain location, coarse-grain location, and identifiers.

17. The non-transitory computer readable medium of claim 15, wherein the activation of the at least one element by the user includes a selection by the user of a category of sinks including the sink, wherein the maximum amount of confidential data is authorized to be leaked to the category of sinks, wherein the category of sinks comprises at least one of internal sinks and external sinks.

18. The non-transitory computer readable medium of claim 15, wherein to track the fine-grain confidential data originating at a source and being transferred to a sink, the instructions further configure the at least one processor to: track a logging or writing of data to a file, or track a writing of confidential data to a socket using an API method, track a storing data to a memory, or track a transmitting of information outside of the computing device.

19. The non-transitory computer readable medium of claim 16, wherein a category of the fine-grain confidential data or coarse-grain confidential data is ranked according to a hierarchy based on a level of confidentiality, said maximum amount of confidential data set for a higher ranking category that may be leaked including confidential data of a lower ranking confidential data category.

20. The non-transitory computer readable medium of claim 15, wherein the instructions further configure the at least one processor to: prevent an application from performing an unauthorized leakage of said fine-grain confidential data when the unauthorized leakage fails to comply with the user's privacy policy setting.

* * * * *